H. J. FISCHER.
EGG TURNING DEVICE FOR INCUBATORS.
APPLICATION FILED JULY 6, 1915.
1,175,031.
Patented Mar. 14, 1916.
2 SHEETS—SHEET 1.
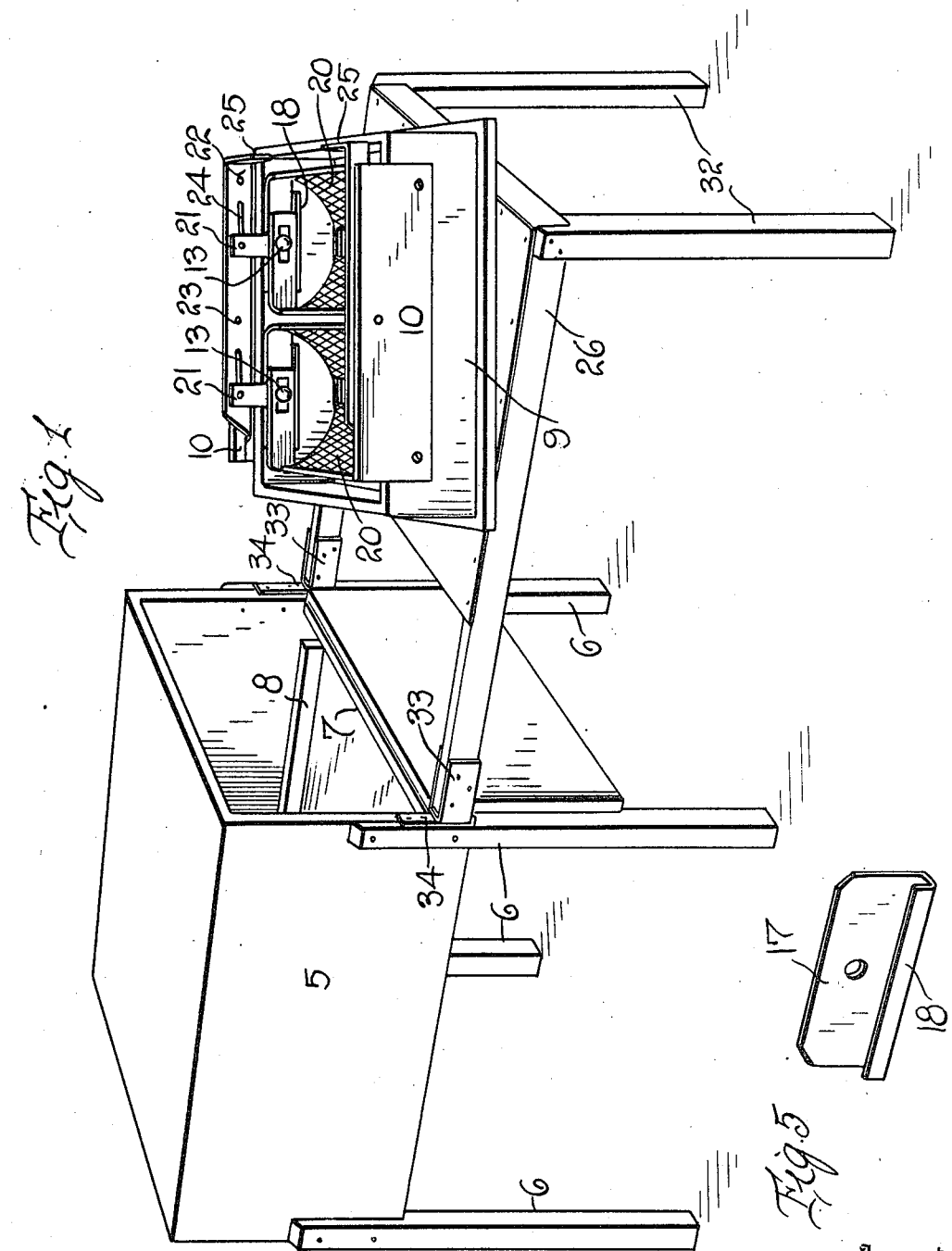
Inventor
H. J. Fischer
By Watson E. Coleman
Attorney

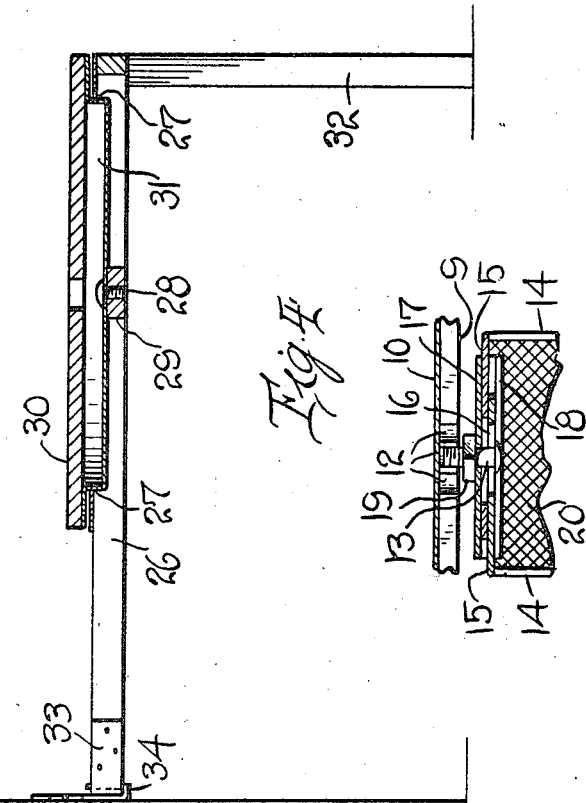
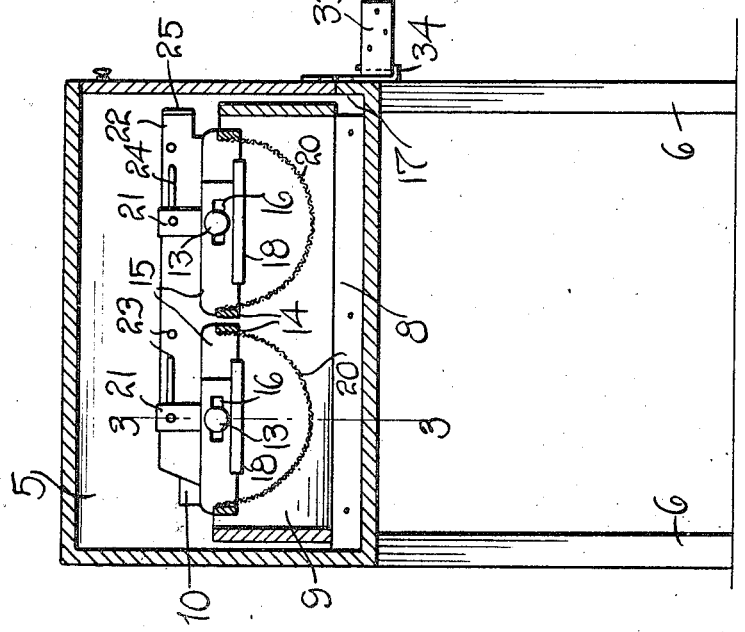

UNITED STATES PATENT OFFICE.

HARRY J. FISCHER, OF COLLIS, MINNESOTA.

EGG-TURNING DEVICE FOR INCUBATORS.

1,175,031.  Specification of Letters Patent.  Patented Mar. 14, 1916.

Application filed July 6, 1915. Serial No. 38,220.

*To all whom it may concern:*

Be it known that I, HARRY J. FISCHER, a citizen of the United States, residing at Collis, in the county of Traverse and State of Minnesota, have invented certain new and useful Improvements in Egg-Turning Devices for Incubators, of which the following is a specification, reference being had to the accompanying drawings.

This invention relates to an improved egg turning device for incubators and has for its primary object to provide simple and easily adjustable means for turning the eggs in the receiving trays so that all sides thereof will be equally exposed to the effects of the heat and the hatching of the eggs expedited.

The invention has for one of its more particular objects to provide a series of egg receiving trays or cradles, a frame in which the trays are pivotally mounted, and means for simultaneously oscillating the trays whereby the eggs are turned.

It is another important object of the invention to provide an egg receiving tray or cradle and means for adjusting the tray to receive eggs of various sizes.

The invention has for a further general object to improve and simplify the construction of egg turning devices of the above character, which is of such construction that the same may be provided in various constructions of incubators now in general use and without greatly adding to the manufacturing cost of the incubator.

With the above and other objects in view, my invention consists in the novel features of construction, combination and arrangement of parts to be hereinafter more fully described, claimed and illustrated in the accompanying drawings, in which, Figure 1 is a perspective view showing the series of egg receiving trays removed from the incubating chamber and arranged upon a rotatable table; Fig. 2 is a vertical section through the incubator, showing the adjustable trays arranged therein; Fig. 3 is a section taken on the line 3—3 of Fig. 2; Fig. 4 is a section taken on the line 4—4 of Fig. 3; and Fig. 5 is a detail perspective view of one of the guide plates in which the ends of the egg receiving trays are adjustably mounted.

Referring in detail to the drawings, 5 designates the body of an incubator which may be of any desired form or construction and is supported upon the legs or uprights 6. One end of this incubating chamber is provided with a hinged door 7. Upon the bottom or base wall of the incubating chamber, at the opposite longitudinal edges thereof, the cleats 8 are secured.

In the preferred embodiment of the invention, I provide a rectangular wooden frame 9 which is adapted to be removably arranged in the incubating chamber and supported upon the cleats 8. To the opposite side bars of this rectangular frame, the metal plates 10 are secured, and these plates project above the upper edges of the frame bars and are inwardly and downwardly bent upon themselves to produce the guide channels 11 therein. In the upper edges of the side bars of the wood frame 9, spaced pairs of notches 12 are formed, and these notches are adapted to receive the pivot bolts 13. Each of the egg receiving trays includes marginal metal bars 14, the ends of which are bent at right angles and are of considerably greater width than the intermediate portion of the bars to provide the slidably engaged plates 15. Each of the end plates 15 is formed with a longitudinal slot 16 through which the pivot bolts 13 extend. The plates 15 are mounted in a guide channel 18 formed in the lower edge of a plate 17 which is centrally provided with an opening to receive the pivot bolt 13. A nut 19 is threaded upon this bolt, whereby the relatively movable end plates 15 of the bars 14 may be tightly clamped in their adjusted positions upon the plate 17. To the parallel longitudinally extending portions of the bars 14, the edges of the reticulated wire fabric or screen 20 are secured, said screen being preferably bent into semi-circular form to receive and support a number of eggs.

The end plates 15 of one of the marginal bars 14 of each egg receiving tray or cradle is formed with an upwardly projecting arm 21. 22 designates slide bars which are longitudinally disposed above the opposite sides of the frame 9 and have their lower edges bent upon themselves and slidably engaged within the grooves or channels 11 on the upper edges of the plates 10. Each of the slide bars is formed with a series of spaced openings 23 in which the angularly disposed ends of the rods 24 are adapted to be engaged. The other ends of these rods are loosely connected to the upwardly projecting arms 21 on the ends of the egg receiving trays. It will be manifest from this construction and arrangement of the several parts, that by shifting or sliding the bars 22 longitudinally upon the plates 10, the egg receiving trays will be oscillated or rocked so that the eggs disposed therein will turn. It is a well known fact that the process of incubation is greatly facilitated by turning the eggs at intervals so that all surfaces thereof will be equally exposed to the effects of the heat. The slidable bars 22 are preferably provided upon one of their ends with the inwardly projecting finger pieces 25 so that said bars may be conveniently operated.

In conjunction with my improved egg turning device above described, I preferably employ a rotatable table or support upon which the frame 9 is adapted to be arranged when removed from the incubating chamber. This support includes a suitable frame 26 having an opening 27 in its top. A vertical bolt or pin 28 is centrally fixed in the transverse frame bar 29. The rotatable table 30 is provided upon its under side with a cylindrical hub 31 which is disposed through the opening 27 and is rotatably held within said opening by the bolt or pin 28. The frame 26 is provided at one end with suitable supporting legs 32 and the longitudinal side bars are extended from the other end of said frame and provided at their extremities with loops 33. To the side walls of the incubator body, at the open end thereof, bracket members 34 are fixed, with which the loops 33 are adapted to be engaged, whereby the table frame is detachably held in connection with the incubator.

In the use of my invention, when it is desired to turn the eggs in the case, the door at the end of the incubator body is opened and the rotatable table connected to the incubator, as above explained. The tray carrying frame 9 is now removed from the interior of the incubator and placed upon the rotatable table 30. The operator now slides the bars 22 so as to rock or oscillate the egg carrying trays. Assuming that the frame 9 was previously arranged in the incubator with the trays extending transversely of the incubator, the table 30 may now be rotated so as to dispose the trays longitudinally with respect to the incubating chamber. The frame 9 is then again inserted in the incubator upon the supporting cleats 8. The extent to which the egg receiving trays are turned may be varied by adjusting the trays in the notches or recesses 12 in the upper edge of the frame 9 and also changing the connection of the rods 24 from one of the openings 23 in the slide bars to an adjacent opening. The trays themselves may be easily and quickly adjusted in order to space the bars 14 thereof so that the trays will receive eggs of various sizes by simply loosening the nuts on the bolts 13 and then shifting the end plates 15 of the trays with respect to each other.

From the foregoing description, taken in connection with the accompanying drawings, the construction, manner of operation and several advantages of my invention will be readily understood.

It will, of course, be obvious that while I have illustrated in the accompanying drawings but two of the adjustable egg trays, any desired number of the same may be employed.

The frame carrying the trays may be very easily and quickly removed from the incubating chamber and the trays then properly adjusted and returned to the incubator.

It is also apparent that my improved mounting and adjusting means for the trays may be provided for use in connection with the several types of incubators which are now on the market and may be separately manufactured and sold.

While the rotatable table for receiving the tray carrying frame is not an essential adjunct of the invention, it is, however, a desirable and convenient feature, as it permits of an easy and quick turning of the egg carrying trays without liability of breaking the eggs, and also enables the frame 9 to be properly positioned so that it can be readily shoved into place within the incubating chamber.

While I have shown and described the preferred construction and arrangement of the several elements of my invention, it will also be understood that the device is susceptible of considerable modification therein and I, therefore, reserve the privilege of adopting all such legitimate modifications as may be fairly embodied within the spirit and scope of the invention as claimed.

Having thus fully described my invention, what I desire to claim and secure by Letters Patent is:—

1. A tray having a body wall of flexible material, and adjustable means connecting the longitudinal edges of said wall and spacing the same apart, the adjustment of said means varying the width of the tray.

2. An adjustable tray having a flexible body wall, relatively adjustable elements connected to the longitudinal edges of said wall at the ends of said tray, and means for securing said elements in various adjusted positions, whereby the width of the tray may be varied.

3. An adjustable tray having a flexible body wall, plates fixed to the longitudinal edges of said wall and extending transversely toward each other at the opposite ends of the tray, and means for adjustably securing said plates together, whereby the width of the tray may be varied.

4. In an egg turning device for incubators, a frame, a plurality of egg receiving trays mounted to oscillate in said frame, each of said trays including parallel longitudinal bars having slidably engaged plates on their corresponding ends, a guide plate in which said slidable plates are mounted, a flexible fabric connecting said parallel bars to receive and support the eggs, bolts securing said slidable plates and the guide plates together to hold the sldiable plates in adjusted position, said bolts being mounted to rock in said frame, and means connected to the opposite ends of the trays for oscillating the same in the frame.

5. In an egg turning device for incubators, a frame, a plurality of egg receiving trays having flexible egg supporting walls, bolts mounted to rock in the frame, means for adjusting the trays upon said bolts to vary the width of the tray whereby the same may receive eggs of various sizes, and means connected to the trays for oscillating the same in the frame.

6. In an egge turning device for incubators, a frame, a plurality of egg receiving trays, each of said trays having a flexible body wall to receive and support the eggs, bolts mounted to rock in the frame, supporting plates on said bolts provided with guides, each of the trays including end plates relatively movable with respect to each other upon the bolts and mounted in said guides, nuts threaded upon the bolts to secure the plates in their adjusted positions, and means slidably mounted upon the opposite sides of the frame and connected to the ends of the trays for oscillating said trays in the frame.

7. An egg receiving tray for incubators comprising a marginal frame having slidably engaged end plates, a flexible body wall attached at its longitudinal edges to the marginal frame, and means for adjustably connecting the end plates of the frame whereby the longitudinal edges of the tray may be moved toward or from each other and the width of the tray varied to receive different sized eggs.

In testimony whereof I hereunto affix my signature in the presence of two witnesses.

HARRY J. FISCHER.

Witnesses:
 JOHN BURNS,
 J. A. FISCHER.